UNITED STATES PATENT OFFICE 2,307,743

PETROLEUM SULPHONATE PRODUCTS

Leo Liberthson, New York, N. Y., and Manuel Blumer, Petrolia, Pa., assignors to L. Sonneborn Sons, Inc., a corporation of Delaware No Drawing. Application January 7, 1941,
Serial No. 373,402

9 Claims. (Cl. 260—504)

This invention relates to petroleum sulphonate products.

The conventional refining treatment of certain lubricating oil distillates derived from petroleum includes the application of fuming sulphuric acid. This reacts with the oil, producing a black sludge containing unreacted sulphuric acid and certain types of sulphonic acids. Though the concentration of $SO_3$ in the fuming acid may vary considerably, a 20% fuming acid is employed in the majority of cases. As a result of the high degree of sulphonation obtained in the acid treatment, a considerable amount of sulphonic acids is produced. These are principally of two types, that is, the so-called water-soluble type predominantly contained in the sludge and the so-called oil-soluble type predominantly found in the oil to the extent of a few percent. The acid application is regulated in the manner well known in the art to produce the desired sulphonation reaction and in general temperatures not exceeding 140° F. are preferred. The acids contained in the sludge, while limitedly soluble, if at all, in hydrocarbon oils, are highly water-soluble, imparting to their aqueous solution a dark-green color, and being for this reason generally referred to as "green petroleum sulphonic acids." The acids left in solution in the oil impart a reddish color to the oil and for this reason are generally referred to as "mahogany petroleum sulphonic acids." After the separation of the oil from the acid sludge, the mahogany sulphonic acids are usually recovered from the oil in the form of a more or less crude mahogany sulphonate stock in accordance with ordinary refining methods comprising direct neutralization of the acid treated oil followed by suitable extraction. This mahogany sulphonate stock, either freed from retained oil, or, dissolved in retained oil, constitutes a valuable by-product of petroleum refining, being used for a variety of purposes but primarily as an emulsifying agent. The green petroleum sulphonic acids are usually recovered in the form of an aqueous green petroleum sulphonate stock and are primarily used as detergents and wetting agents.

The formation of petroleum sulphonic acids in the treatment of lubricating oil distillates is accompanied by a number of side reactions such as oxidation, esterification, polymerization, and condensation, resulting in part in the production of substances that are detrimental to and impair the efficiency of the recovered sulphonate stocks by which they are carried. Due to the fact, however, that the side reactions are to some extent but partial reactions, that are completed only after a comparatively long period of time, the petroleum sulphonate stocks, carrying the partial reaction products, will upon standing undergo changes in the direction of the completion of the side reactions resulting in the formation of an additional amount of efficiency impairing substances, thus rendering the petroleum sulphonate stocks substantially unstable during storage. These deleterious substances are highly colored bodies of a tarry, resinous, highly viscous character. In the case of mahogany sulphonates, the substances are predominantly of a water-in-oil emulsion forming type tending to counteract and stabilize the otherwise oil-in-water emulsion forming properties, for which reason it has been necessary in the past to add auxiliary substances, such as soaps, fatty acids, alkalies, etc., for the purpose of procuring at least to some extent the desired emulsifying efficiency of the mahogany sulphonates. In the case of the green sulphonate stock, the deleterious substances are predominantly of an interfacial surface tension increasing type which tend to counter-act and detract from the normal detergent and wetting or surface tension decreasing properties of the green sulphonates.

In U. S. Patent No. 2,201,119, Blumer, et al., a procedure is disclosed by which a mahogany sulphonate stock is treated for the purpose of substantially removing therefrom water-in-oil emulsion forming substances by suitable treatment of the stock with an alkali hypochlorite. The products obtained when utilizing this procedure, however, though satisfactory for many purposes, cannot be readily processed when such processing involves a heat treatment, as they will darken to an extent objectionable for many purposes. It is not exactly known to what this darkening is attributable, but it is assumed that the hypochlorite action, though effectively removing deleterious matter, gives rise to the formation of substances which, upon subsequent heating, are converted into products responsible for the darkened color. Furthermore, the hypochlorite process is specific to mahogany sulphonates and is not capable of removing the objectionable interfacial surface tension increasing substances from green sulphonate stocks. In fact, the hypochlorite action will not produce a color improving effect of any kind upon green sulphonate stock.

We have discovered a procedure applicable to any petroleum sulphonate stock whether the same be of the mahogany or of the green sulphonate type, and which will effectively remove the deleterious substances herein referred to yielding products which, upon subsequent processing, involving heat treatment, will not darken to any appreciable extent.

In accordance with the invention a petroleum sulphonate stock is contacted in the presence of a suitable solvent for the petroleum sulphonate contained in that stock with an alkali chlorite. The solvents that may be used for this purpose should be substantially neutral to alkali chlorite action and their boiling range should be preferably sufficiently low to permit their removal, if desired, in the customary manner, such as by distillation in vacuo or otherwise without causing thereby a partial decompositon of the sulphonates dissolved therein. It is of advantage that the boiling point be so low and preferably between 75 and 250° F. as to enable the removal of the solvent at ordinary temperatures without the necessity of resorting to vacuum distillation. When treating mahogany sulphonate stocks, suitable solvents that may be used in the practice of our invention are, for instance, petroleum oil distillates or any fractions thereof, benzol, naphtha, carbon tetrachloride, tetrachlorethane, chloroform, etc., and in general any aromatic, or aliphatic, or aryl, or aralkyl hydrocarbons, including their halogenated derivatives of the above-described character and nature. When treating a green sulphonate stock, suitable solvents that may be used in the practice of our invention are, for instance, the volatile aliphatic alcohols and ketones, water, and in general, all water-miscible organic solvents or their aqueous solutions.

In the practical application of our invention, the crude petroleum sulphonate stock is dissolved in the solvent and the solution is thereafter contacted with an alkali chlorite, such as sodium or potassium chlorite, preferably in aqueous solution, as intimately as possible and preferably with the aid of agitation. It is preferred to so adjust the pH during the treatment that the same is below pH7. For optimum results a pH from 6.5 to 6.8 is recommended. The temperature of treatment may be room temperature or any increased temperature that may be demanded by the presence of special conditions, such as high viscosities or the like. The ratio of petroleum sulphonate stock to solvent is not material as a rule, though it is preferable to so adjust the same as to afford maximum contact of the reactants with due regard to considerations of viscosity. The lower the viscosity, the better will be the intimate contact between the reagents. Any conventional method may be used, such as stirring, air-blowing, shaking, etc.

The completion of the reaction, i. e., the substantial removal in the case of mahogany sulphonates, of water-in-oil emulsion forming substances and, in the case of green sulphonates, of inter-facial surface tension increasing substances, is indicated by the color change of the petroleum sulphonate stock solution which possesses an original Lovibond color of in excess of 15R and in many cases in excess of 20R. A color change to 8R or less and preferably to 2R (measured by the Lovibond system) connotes the accomplishment of the desired result. Whereas 1 to 4% of alkali chlorite will give a Lovibond color of less than 8R, but above 2R, an amount of 5% alkali chlorite is usually necessary to obtain a Lovibond color of substantially 2R or less.

When treating mahogany sulphonate stock in accordance with the invention, a two layer system is formed comprising essentially a lower aqueous layer containing predominantly inorganic matter and an upper solvent layer containing predominantly mahogany sulphonate products in solution. The top layer is worked up to remove undesirable inorganic impurities, such as by centrifuging, filter pressing, or other like conventional means. Alternatively, the mahogany sulphonate layer may be treated in accordance with the method described in U. S. Patent to Kessler et al. (No. 2,140,263). When a petroleum mahogany sudphonate product is subjected to the process in accordance with the invention, we prefer to use as the solvent that hydrocarbon fraction, the acid refining of which furnishes the crude mahogany sulphonate stock, which retains as a rule varying amounts of this fraction commonly referred to as retained oil. Such retained oil content of crude mahogany sulphonate stock is usually up to 36% or more and constitutes as such a convenient mahogany sulphonate solution that may be subjected directly to the alkali chlorite treatment.

When a petroleum green sulphonate stock has been treated in accordance with the invention, as a rule, a single phase system results in which the major portion of the alkali chloride resulting from the chlorite treatment is dissolved in the solvent. When working up the treated green sulphonate solution by removing a substantial amount of solvent therefrom the alkali chloride is eliminated from the solution by precipitation. This is particularly true when water or other predominantly aqueous medium is utilized as a solvent, in which case an approximately 50% removal of solvent will substantially quantitatively precipitate the alkali chloride.

After the removal of inorganic impurities from the treated petroleum sulphonate stock, the respective sulphonate products obtained may be used either as such, i. e., in the form of their solutions such as the mahogany sulphonate in solution in retained oil, or the green sulphonate in aqueous solution, or the products may be further worked up, if desired, by removing the respective solvents and recovering substantially solvent free petroleum sulphonate products.

The chlorite treatment in accordance with this invention is thus applicable both to petroleum mahogany sulphonates, as well as to petroleum green sulphonates. In each case the deleterious substances above-referred to are effectively removed and the resulting products which are substantially free from inorganic impurities, will not deteriorate to any appreciable extent during storage, and will not substantially darken upon being processed or otherwise treated under conditions involving heat treatment. The mahogany sulphonate products obtained in accordance with the invention are substantially free from water-in-oil emulsion forming substances and capable of producing spontaneous stable emulsions and the green petroleum sulphonate products obtained in accordance with the invention are substantially free from inter-facial surface tension increasing substances and possess a high degree of detergent and wetting efficiency. When using 5% alkali chlorite, the treatment in accordance with the invention will yield in the majority of cases ultimate products having a Lovibond color as low as substantially 1R.

The following examples in accordance with our invention are given by way of illustration and not of limitation.

Example I

Three parts by weight of a 66% (by weight) crude mahogany sulphonate stock solution in retained oil, obtained from the acid refining of a medicinal white oil stock, are adjusted by the addition of acid (dilute sulphuric acid) to a pH of approximately 6.8. The sulphonate stock solution is thereupon heated to 220° F. (for viscosity reduction purposes) and thoroughly agitated with one part by weight of a 10% aqueous sodium chlorite solution until the color is less than 8R (Lovibond system) and preferably less than substantially 2R. This result is obtained as a general rule after agitating for approximately two hours. The mix is then permitted to stratify, whereupon the lower aqueous layer is drawn off and the top layer freed from its salt content by either centrifuging, filter pressing, or the like, or alternatively, by the above referred to Kessler et al. method. When resorting to centrifuging or filter pressing, it is desirable to maintain a temperature of substantially 220° F. for viscosity reducing reasons. The recovered mahogany sulphonate solution in retained oil may be used as such, or if desired, freed from its oil content in the conventional manner.

Example II

Three parts by weight of a 50% (by weight) aqueous solution of crude green sulphonate stock obtained from the sludge of an acid refined medicinal white oil stock is admixed with a sufficient quantity of dilute sulphuric acid to adjust its pH to substantially 6.8. The green sulphonate stock solution is then heated to approximately 180° F. and thoroughly agitated with one part by weight of a 10% aqueous sodium chlorite solution until the color is less than substantially 2R. Approximately two hours of agitation will usually suffice. The water added with the aqueous chlorite solution is thereafter evaporated so as to bring the green sulphonate solution back to the original 50% sulphonate content, whereupon the sodium chloride formed during the treatment will precipitate upon cooling of the solution. The aqueous green sulphonate solution obtained in this manner may be used as such or, if desired, substantially dehydrated to dryness.

When in the specification and claims reference is made to a given Lovibond color as possessed by a petroleum sulphonate or a petroleum sulphonate stock or product, we mean thereby that color value yielded in a half-inch Lovibond cell by an approximately 6% solution of such substance (calculated on weight of petroleum sulphonates present) in a substantially colorless transparent solvent, such as white oil.

The foregoing description is by way of illustration and not of limitation and we are not to be limited to any details but only by the appended claims in which we have endeavored to claim broadly all inherent novelty.

We claim:

1. Process for obtaining an improved petroleum sulphonate product comprising intimately contacting in the presence of water a solution of a petroleum sulphonate stock, derived from the acid treatment of a petroleum lubricating oil distillate under sulphonating conditions, in a solvent for such sulphonate with an alkali metal chlorite in amount and for a period of time sufficient to yield a product having a Lovibond color of less than 8R at a pH substantially below 7, and thereafter recovering a petroleum sulphonate product substantially stable during storage and substantially non-darkening when subjected to raised temperatures, said solvent being substantially inert to alkali chlorite action.

2. Process in accordance with claim 1 in which said petroleum sulphonate solution is contacted with said alkali metal chlorite at a pH of substantially between 6.5 and 6.8.

3. Process for obtaining an improved petroleum sulphonate product comprising intimately contacting in the presence of water a solution of a petroleum sulphonate stock, derived from the acid treatment of a petroleum lubricating oil distillate under sulphonating conditions, in a solvent for said petroleum sulphonate with an aqueous solution of 1 to 5% of alkali metal chlorite calculated on the amount of petroleum sulphonate present in the stock at a pH substantially between 6.5 and 7 for a period of time sufficient to yield a Lovibond color of less than 8R and thereafter recovering a petroleum sulphonate product substantially stable during storage and substantially non-darkening when subjected to raised temperatures, said solvent being substantially inert to alkali chlorite action.

4. Process for obtaining an improved petroleum sulphonate product comprising intimately contacting in the presence of water a solution of a petroleum mahogany sulphonate stock, derived from the acid treatment of a petroleum lubricating oil distillate under sulphonating conditions, in a solvent for said mahogany sulphonate at a pH substantially between 6.5 and 7 with an alkali metal chlorite in amount and for a period of time sufficient to yield a product having a Lovibond color of less than substantially 8R and thereafter recovering a petroleum mahogany sulphonate product substantially stable during storage, substantially non-darkening when subjected to raised temperatures, and capable of yielding substantially stable spontaneous oil-in-water emulsions, said solvent being substantially inert to alkali metal chlorite action.

5. Process for obtaining an improved petroleum sulphonate comprising intimately contacting a solution of mahogany petroleum sulphonate stock, derived from the acid treatment of a petroleum lubricating oil distillate under sulphonating conditions, in a solvent for said mahogany sulphonate at a pH of substantially between 6.5 and 7 with an aqueous solution of 1 to 5% alkali metal chlorite calculated on the amount of mahogany sulphonates present in the stock, for a period of time sufficient to yield a product having a Lovibond color of less than substantially 8R and thereafter recovering a petroleum mahogany sulphonate product substantially stable during storage, substantially non-darkening when subjected to raised temperatures and capable of yielding substantially stable spontaneous oil-in-water emulsions, said solvent being substantially inert to alkali metal chlorite action.

6. Process in accordance with claim 5 in which said solvent is retained oil, in which said period of time is sufficient to yield a product having a Lovibond color of less than substantially 2R and in which said pH is substantially 6.8.

7. Process for obtaining an improved petroleum sulphonate comprising intimately contacting in the presence of water a solution of a petroleum green sulphonate stock, derived from the acid treatment of a petroleum lubricating oil distillate under sulphonating conditions, in a solvent for said green petroleum sulphonate at a pH substantially between 6.5 and 7 with an alkali metal chlorite in amount and for a period of time sufficient to yield a product having a Lovibond color of less than substantially 8R and thereafter recovering a petroleum mahogany sulphonate product substantially stable during storage, substantially non-darkening when subjected to raised temperatures, and of high wetting and detergent efficiency, said solvent being substantially inert to alkali metal chlorite action.

8. Process for obtaining an improved petroleum sulphonate comprising intimately contacting a solution of petroleum green sulphonate stock, derived from the acid treatment of a petroleum lubricating oil distillate under sulphonating conditions, in a solvent for said petroleum green sulphonate at a pH of substantially between 6.5 and 7 with an aqueous solution of 1 to 5% alkali metal chlorite calculated on the amount of petroleum green sulphonate present in the stock, for a period of time sufficient to yield a product having a Lovibond color of less than substantially 8R and thereafter recovering a petroleum green sulphonate product substantially stable during storage, substantially non-darkening when subjected to raised temperatures and of high wetting and detergent efficieency, said solvent being substantially inert to alkali metal chlorite action.

9. Process in accordance with claim 8 in which said solvent is water, in which said period of time is sufficient to yield a product having a Lovibond color of less than substantially 2R and in which said pH is substantially 6.8.

LEO LIBERTHSON.
MANUEL BLUMER.